(12) United States Patent
Okada et al.

(10) Patent No.: US 6,783,223 B2
(45) Date of Patent: Aug. 31, 2004

(54) WATER BASE INK FOR INK-JET RECORDING AND INK-JET RECORDING APPARATUS PROVIDED WITH THE SAME

(75) Inventors: Mayuko Okada, Toyota (JP); Narumi Koga, Nagoya (JP); Kazuma Goto, Nagoya (JP); Hiromitsu Sago, Tokai (JP); Hideto Yamazaki, Nagoya (JP); Kazuo Kobayashi, Kagamihara (JP); Tatsunosuke Hoshi, Nagoya (JP); Michiko Aoyama, Nagoya (JP); Hideo Ohira, Tajimi (JP); Shunichi Higashiyama, Yotsukaichi (JP); Masaya Fujioka, Nagoya (JP); Yoshito Toyoda, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 10/379,596

(22) Filed: Mar. 6, 2003

(65) Prior Publication Data

US 2003/0218661 A1 Nov. 27, 2003

(30) Foreign Application Priority Data

Mar. 8, 2002 (JP) .................................... 2002-064299

(51) Int. Cl.$^7$ ................................................. B41J 2/01
(52) U.S. Cl. ...................... 347/100; 347/95; 106/31.13
(58) Field of Search ........................... 347/100, 95, 96, 347/101; 106/31.13, 31.27, 31.6

(56) References Cited

U.S. PATENT DOCUMENTS

| 4,959,668 A | * | 9/1990 | Hirt | 347/163 |
| 5,145,758 A | * | 9/1992 | Kossmehl et al. | 430/49 |
| 6,224,735 B1 | * | 5/2001 | Akutsu et al. | 205/91 |

FOREIGN PATENT DOCUMENTS

| JP | A 7-195685 | 8/1995 |
| JP | A 10-119263 | 5/1998 |
| JP | A 2000-43253 | 2/2000 |
| JP | A 2002-36545 | 2/2002 |

* cited by examiner

Primary Examiner—Stephen D. Meier
Assistant Examiner—Manish Shah
(74) Attorney, Agent, or Firm—Oliff & Berridge, PLC

(57) ABSTRACT

A water base ink for ink-jet recording, which is usable for an ink-jet recording apparatus having an ink-jet head provided therein with an ink flow passage formed of nickel or nickel alloy, includes a coloring agent, water, and a water-soluble organic solvent. The ink is blended so that a current density, which is obtained within an electric potential range of −600 to +300 mV, is not more than 100 $\mu A/cm^2$ when anodic polarization measurement is performed by using a reference electrode of silver/silver chloride, a counter electrode of platinum, and a working electrode of nickel or nickel alloy. The ink does not corrode any part for constituting the flow passage in the ink-jet head.

6 Claims, 8 Drawing Sheets

WATER BASE INK FOR INK-JET
RECORDING AND INK-JET RECORDING
APPARATUS PROVIDED WITH THE SAME

BACKGROUND OF THE INVENTION

1. Field of the Invention

The present invention relates to a water base ink for ink-jet recording, an ink-jet recording apparatus provided with the ink, and a method for producing the ink.

2. Related Art

In the ink-jet recording system, ink droplets are formed by using a variety of ink discharge methods including, for example, the electrostatic attraction method, the method in which mechanical vibration or displacement is applied to the ink by using a piezoelectric element, and the method in which bubbles are generated by heating the ink to utilize the pressure generated thereby, and all or a part of the ink droplets are adhered to an objective recording material such as paper to perform the recording. In particular, the ink-jet recording system, in which the mechanical vibration or the displacement is applied to the ink by using the piezoelectric element, is excellent in that the amount of electric power consumption is relatively small, and it is unnecessary to consider the stability of the ink with respect to the heat because no heat is applied to the ink.

Those known as the ink to be used for the ink-jet recording method as described above include those obtained by dissolving or dispersing a variety of water-soluble dyes or pigments in water or a liquid medium composed of water and a water-soluble organic solvent. The ink is required to have the optimum performance characteristics to be used for the ink-jet recording method. Specifically, for example, the following features are required. That is, neither deposition nor aggregation is caused even when the ink is not used for a long period of time. The ink does not cause any clog-up in the ink flow passage or at the tip of the ink-jet head of the ink-jet printer. The printing quality is satisfactory, and the weather resistance is excellent. Neither resin nor metal used for the ink-jet head is polluted.

The ink-jet head of the ink-jet printer, which is based on the use of the piezoelectric element to be used for the system in which the mechanical vibration or the displacement is applied to the ink by using the piezoelectric element, has a structure in which a metal member makes direct contact with the ink in many cases. Specifically, for example, in Japanese Patent Application Laid-open No. 7-195685, stainless steel is used for materials of a nozzle plate and an ink supply plate. In Japanese Patent Application Laid-open No. 10-119263, nickel, which is obtained by the electroforming technique, is used for a material of a nozzle plate. In Japanese Patent Application Laid-open No. 2000-43253, nickel is used for a material of a vibration plate, and stainless steel is used for materials of a chamber plate, a nozzle plate, and an ink supply plate. In Japanese Patent Application Laid-open No. 2002-36545, a nickel alloy steel plate is used for a material for an ink supply plate.

The following problem has hitherto arisen, for example, in the ink-jet head of the ink-jet printer based on the use of the piezoelectric element as described above. That is, when the ink-jet head has the structure in which the metal and the ink make direct contact with each other and especially the ink is a water base ink, then the metal is corroded by the ink and the clog-up and the discharge failure are seriously caused.

SUMMARY OF THE INVENTION

The present invention has been made in order to solve the problems involved in the conventional techniques as described above, an object of which is to provide a water base ink for ink-jet recording which does not corrode metal in an ink-jet head provided with an ink flow passage formed of specified metal, an ink-jet recording apparatus which accommodates the ink, and a method for producing such an ink.

According to a first aspect of the present invention, there is provided a water base ink for ink-jet recording which is usable for an ink-jet recording apparatus having an ink-jet head provided therein with an ink flow passage formed of nickel or nickel alloy, the water base ink for ink-jet recording comprising:

a coloring agent;
water; and
a water-soluble organic solvent, wherein:
 a current density, which is obtained within an electric potential range of −600 to +300 mV, is not more than 100 $\mu A/cm^2$ when anodic polarization measurement is performed by using a reference electrode of silver/silver chloride, a counter electrode of platinum, and a working electrode of nickel or nickel alloy.

In the water base ink for ink-jet recording of the present invention, the current density, which is measured under the condition of the anodic polarization measurement described above, is not more than 100 $\mu A/cm^2$. Therefore, even when the ink is used in an ink-jet recording apparatus provided with an ink-jet head comprising therein a member for constituting an ink flow passage formed of nickel or nickel alloy including, for example, a nozzle plate, an ink supply plate, a vibration plate, and a chamber plate, it is possible to effectively avoid the corrosion of the member as described above. Thus, it is possible to avoid the clog-up and the discharge failure of the ink-jet recording apparatus. In order to avoid the corrosion of the member as described above more effectively, the ink may further comprise benzotriazole.

According to a second aspect of the present invention, there is provided an ink-jet recording apparatus comprising:

an ink-jet head which jets an ink and which is provided therein with an ink flow passage formed of nickel or nickel alloy; and
an ink tank which accommodates the ink, wherein:
 the ink comprises a coloring agent, water, and a water-soluble organic solvent; and
 a current density, which is obtained within an electric potential range of −600 to +300 mv, is not more than 100 $\mu A/cm^2$ when the ink is subjected to anodic polarization measurement by using a reference electrode of silver/silver chloride, a counter electrode of platinum, and a working electrode of nickel or nickel alloy. The ink-jet recording apparatus of the present invention is provided with the ink of the present invention which makes it possible to effectively avoid the corrosion of nickel or nickel alloy. Therefore, it is possible to maintain satisfactory ink-jetting characteristics for a long period of time. The ink tank may be an ink container fixedly provided in the apparatus or an ink cartridge which is replaceable.

According to a third aspect of the present invention, there is provided a method for producing a water base ink for ink-jet recording which is usable for an ink-jet recording apparatus having an ink-jet head provided therein with an ink flow passage formed of nickel or nickel alloy, the method comprising:

blending a coloring agent, water, and a water-soluble organic solvent so that a current density, which is obtained within an electric potential range of −600 to +300 mV, is not more than 100 $\mu A/cm^2$ when anodic polarization measurement is performed for the ink by using a reference electrode of silver/silver chloride, a counter electrode of platinum, and a working electrode of nickel or nickel alloy. More specifically, the blending ratios of the coloring agent, water, and the water-soluble organic solvent and the types of the coloring agent and the water-soluble organic solvent, especially the type of the coloring agent are appropriately selected when the ink is prepared so that the current density, which is measured under the condition of the anodic polarization measurement, is not more than 100 $\mu A/cm^2$. In particular, it is desirable that benzotriazole is further added to the ink in order to effectively avoid the corrosion of the member for constituting the ink flow passage formed of nickel or nickel alloy.

DESCRIPTION OF THE PREFERRED EMBODIMENTS

The water base ink for ink-jet recording of the present invention is usable for the ink-jet recording apparatus in which the metal is used in the ink-jet head. The ink-jet recording apparatus, which is based on the use of the metal in the ink-jet head as described above, is not specifically limited. The ink-jet recording apparatus includes, for example, an ink-jet printer which utilizes a piezoelectric element based on the use of a metal member for the ink-jet head. The metal member includes, for example, a nozzle plate, an ink supply plate, a vibration plate, and a chamber plate. In the present invention, it is intended to use nickel or nickel alloy as the metal species. The nickel or nickel alloy includes, for example, iron-nickel alloy and electroformed nickel. Metals other than the above may be exemplified by metals including, for example, stainless steel such as SUS 304, 316, 420, and 430; copper; and titanium alloy.

The anodic polarization measurement is specifically performed as follows. That is, the silver/silver chloride as the reference electrode is immersed in a saturated potassium chloride solution, and the platinum as the counter electrode and the metal (nickel or nickel alloy in this case) to be used in the ink-jet head as the working electrode are immersed in the water base ink for ink-jet recording as the measurement objective set to a temperature of 50 to 70° C. The atmosphere of the working electrode is continuously changed from the reducing atmosphere to the oxidizing atmosphere to measure the behavior of the current density.

The silver/silver chloride is used as the reference electrode. In general, the reference electrode includes, for example, the silver/silver chloride electrode, the hydrogen electrode, the calomel electrode, the mercury/mercury oxide electrode, and the mercury/mercury sulfate electrode. However, in view of the convenience for use and the safety, the silver/silver chloride electrode is generally used.

The platinum is used as the counter electrode. In general, an inert substance is used as the counter electrode including, for example, platinum, gold, palladium, rhodium, and carbon. However, the platinum is excellent in view of, for example, the versatility and the cost.

The metal to be used in the ink-jet head of the ink-jet recording apparatus is used as the working electrode. In particular, the nickel or nickel alloy is used. Specifically, there may be exemplified, for example, iron-nickel alloy; electroformed nickel; and other nickel alloys. When the metal member, which is used for the ink-jet recording, is stainless steel such as SUS 304, 316, 420, and 430; copper; and titanium alloy, such a metal may be used.

Figure 1:
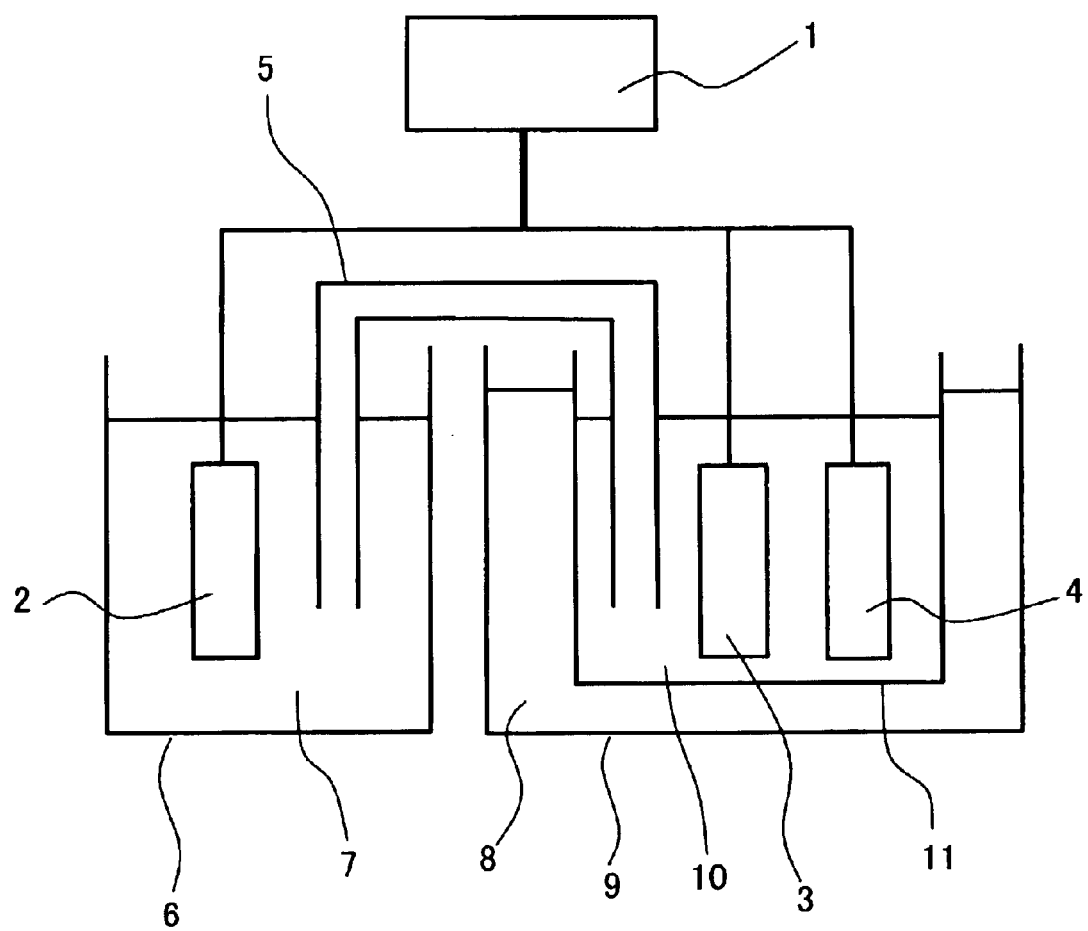
FIG. 1 shows a schematic view illustrating an anodic polarization-measuring apparatus used in Examples.
Figure 2:
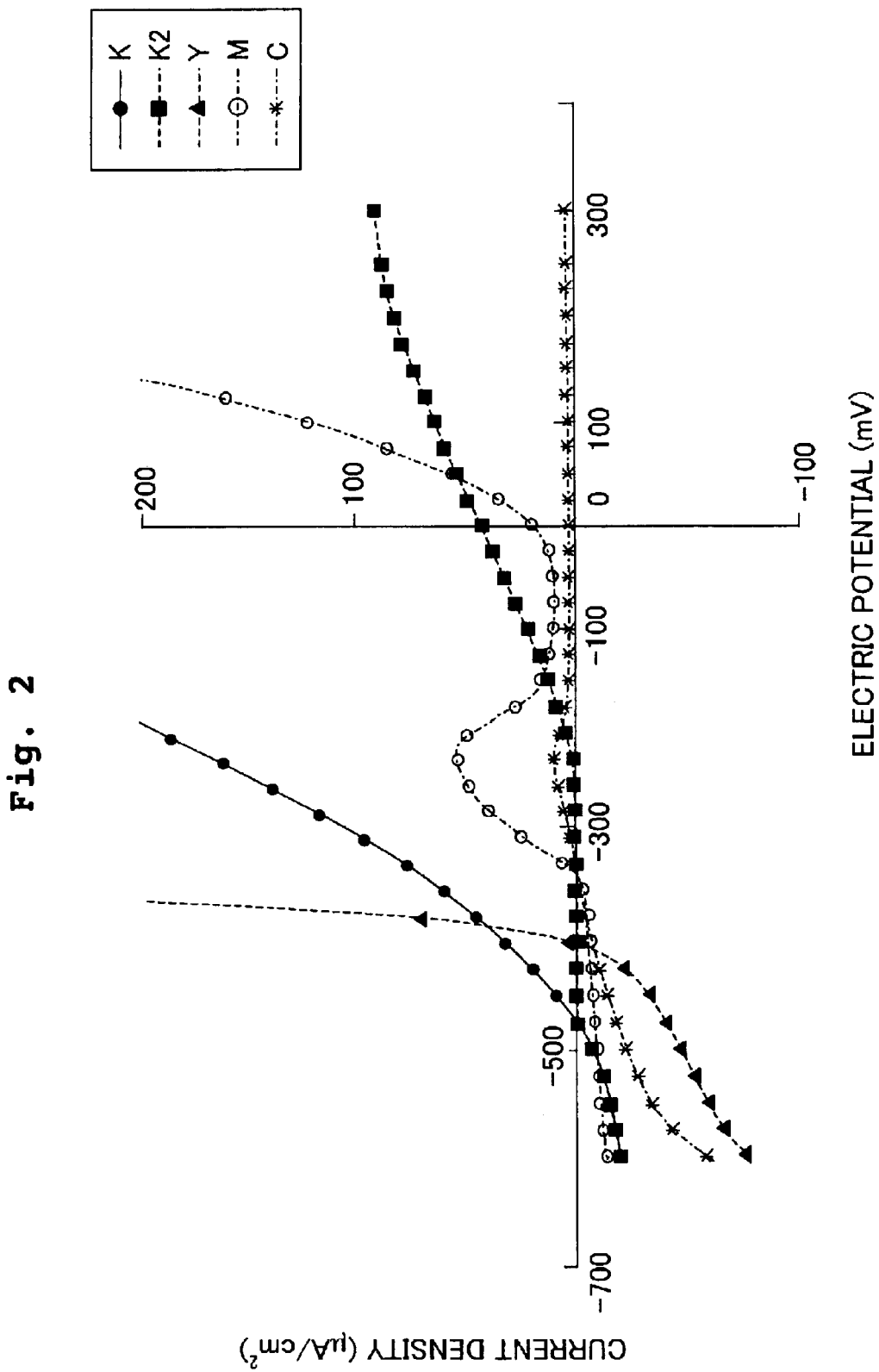
FIG. 2 shows the change of the current density obtained when an iron-nickel alloy (42 alloy) is used for a working electrode.
Figure 3:
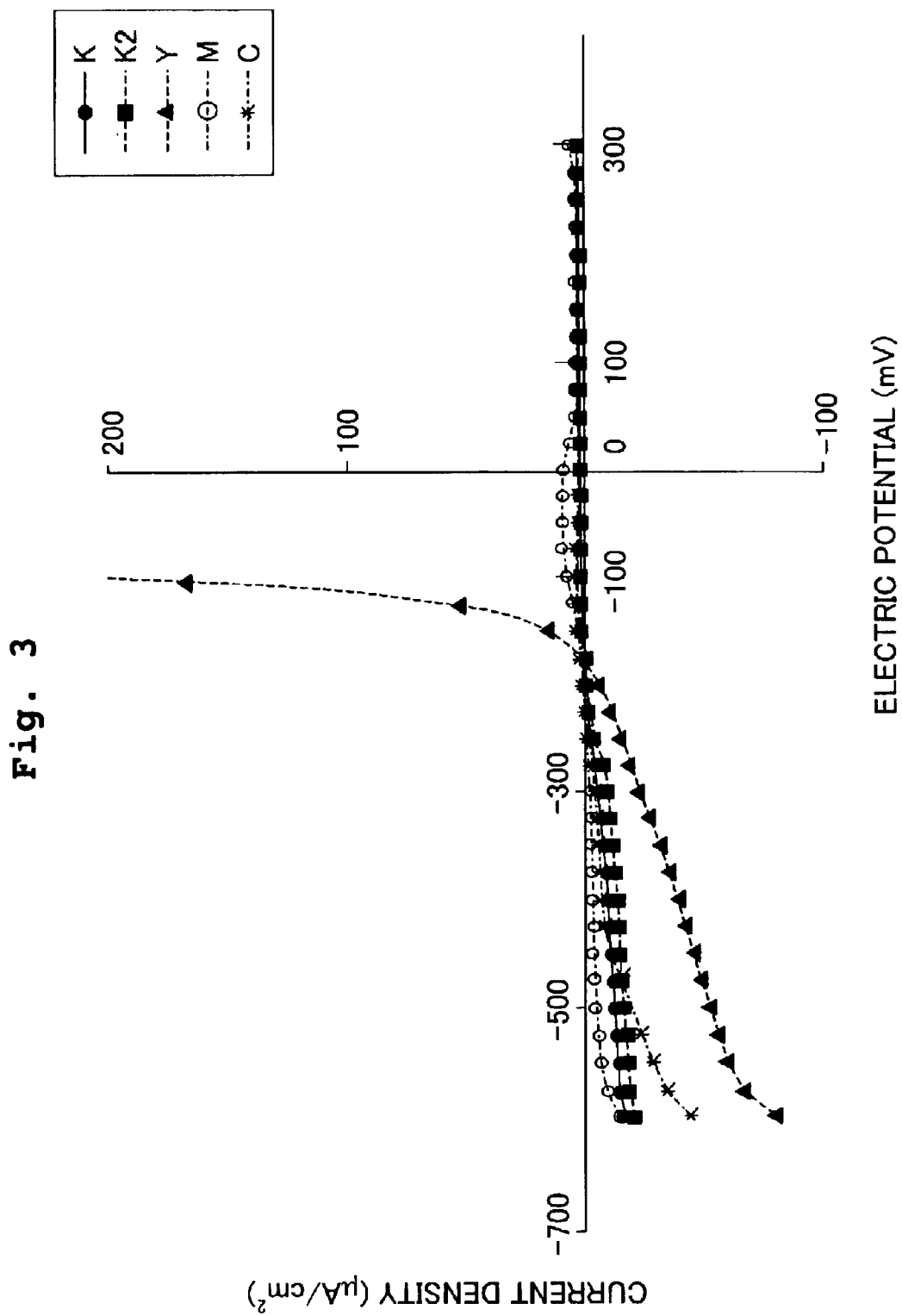
FIG. 3 shows the change of the current density obtained when a nickel alloy is used for a working electrode.
Figure 4:
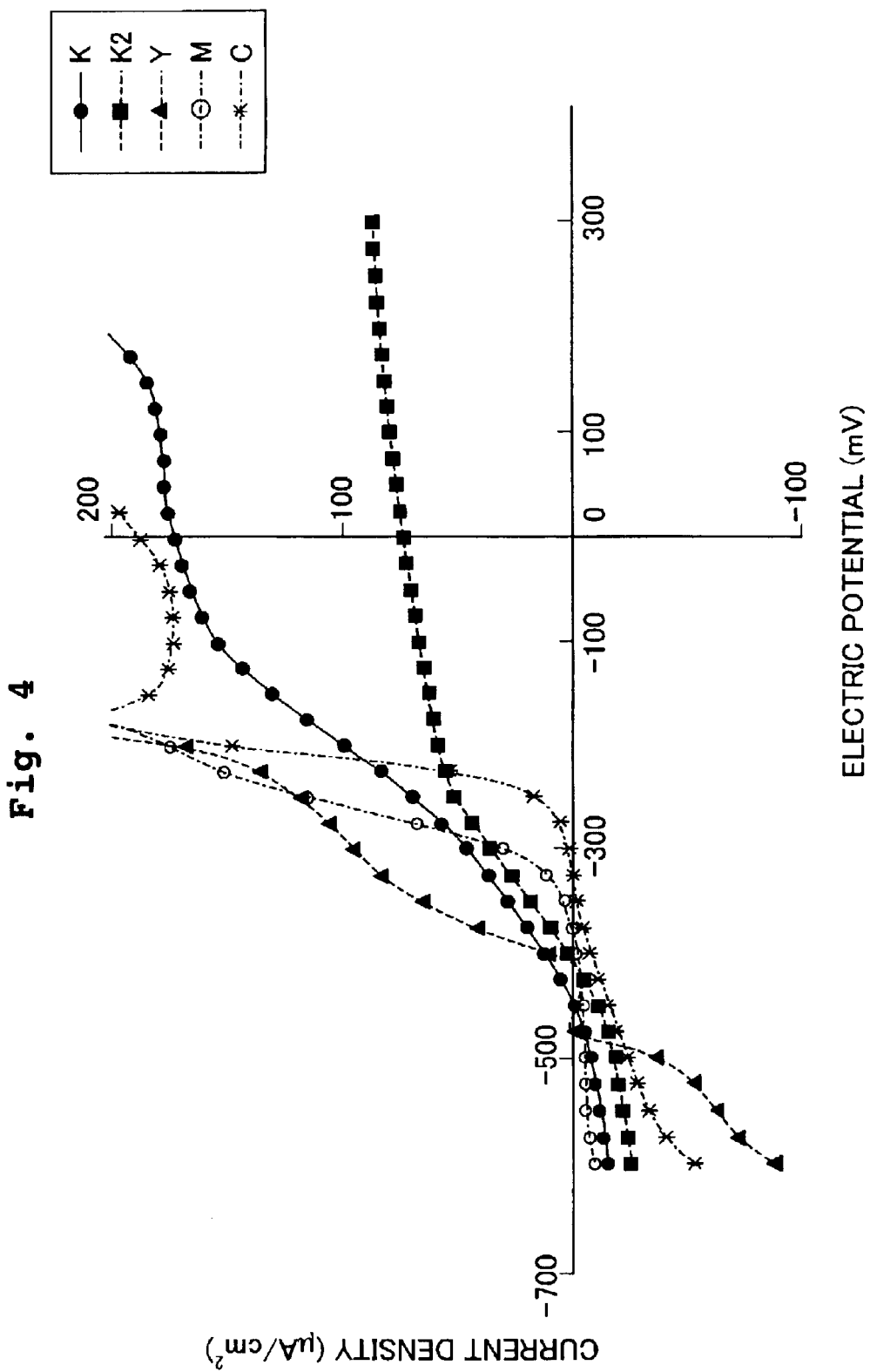
FIG. 4 shows the change of the current density obtained when a nickel-phosphorus alloy is used for a working electrode.
Figure 5:
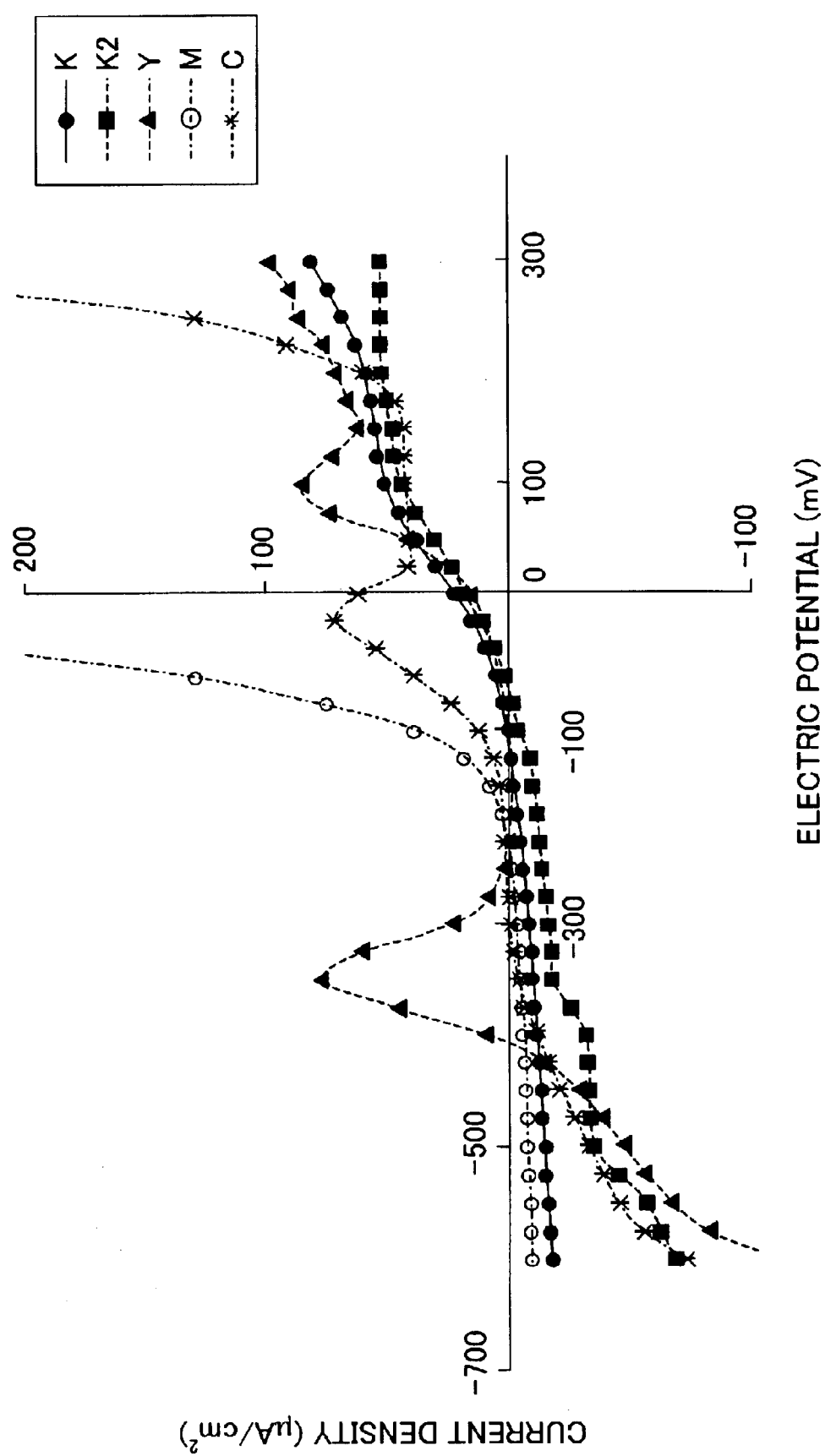
FIG. 5 shows the change of the current density obtained when copper is used for a working electrode.

The specified method for the anodic polarization measurement is not especially limited. There may be exemplified, for example, a method which is carried out by using an apparatus shown in FIG. 1 based on the use of an electrochemical measuring system (HZ-3000 produced by Hokuto Denko Co., Ltd.). The apparatus shown in FIG. 1 comprises a portion composed of a reference electrode tank 6 filled with a saturated potassium chloride solution 7 in which a reference electrode 2 is immersed, a portion composed of a beaker 11 filled with a water base ink 10 for ink-jet recording in which a working electrode 3 and a counter electrode 4 are immersed and a thermostatic tank 9 for maintaining a constant temperature of the beaker 11, and a portion composed of a main apparatus body 1 electrically connected to the respective electrodes. The water base ink 10 for ink-jet recording and the saturated potassium chloride solution 7 are connected to one another by a potassium chloride salt bridge 5. The measurement procedure for the anodic polarization measurement based on the use of the apparatus shown in FIG. 1 is not specifically limited. The measurement can be performed, for example, in accordance with the following procedures (1) to (5). (1) The water base ink 10 for ink-jet recording is introduced into the beaker 11, and the beaker 11 is immersed for 30 to 60 minutes in the thermostatic tank 9 set to a temperature of 50 to 70° C. so that the temperature of the water base ink 10 for ink-jet recording is 50 to 70° C. (2) A metal piece, which is used for the working electrode 3, is immersed for 5 minutes in an alkaline washing solution (ACE CLEAN 850 produced by Okuno Chemical Industries Co., Ltd.) at 50 to 70° C., and then the metal piece is washed with pure water. (3) The metal piece to be used as the working electrode 3 and a platinum plate to be used as the counter electrode 4, which are electrically connected to the main apparatus body 1, are immersed in the water base ink 10 for ink-jet recording introduced into the beaker 11. (4) A silver/silver chloride plate to be used as the reference electrode 2, which is electrically connected to the main apparatus body 1, is immersed in the saturated potassium chloride solution 7 introduced into the reference electrode tank 6 connected to the water base ink 10 for ink-jet recording introduced into the beaker 11 by the aid of the potassium chloride salt bridge 5. (5) The electric potential is continuously changed within an electric potential range of −600 to +300 mV to measure the current density.

The water base ink for ink-jet recording of the present invention is used in combination with the ink-jet recording apparatus based on the use of the metal in the ink-jet head. When the anodic polarization measurement is performed on condition that the reference electrode is silver/silver chloride, the counter electrode is platinum, and the working electrode is the metal as described above, the current density, which is obtained within the electric potential range of −600 to +300 mV, is not more than 100 μA/cm². Accordingly, the metal is not corroded by the ink, and it is possible to avoid the clog-up and the discharge failure of the ink-jet recording apparatus.

The water base ink for ink-jet recording of the present invention is not specifically limited provided that the ink has the characteristics as described above. In general, the ink contains, for example, a coloring agent and a solvent. The coloring agent may be any one of the dye and the pigment. The dye is not specifically limited, including, for example, water-soluble dyes such as direct dyes, acid dyes, basic dyes, and reactive dyes. In particular, those especially preferred, which satisfy the performance including, for example, vividness, water solubility, stability and weather resistance, specifically include, for example, C. I. Direct Black 17, 19, 32, 51, 71, 108, 146, 154, 168; C. I. Direct Blue 6, 22, 25, 71, 86, 90, 106, 199; C. I. Direct Red 1, 4, 17, 28, 83, 227; C. I. Direct Yellow 12, 24, 26, 86, 98, 132, 142; C. I. Direct Orange 34, 39, 44, 46, 60; C. I. Direct Violet 47, 48; C. I. Direct Brown 109; C. I. Direct Green 59; C. I. Acid Black 2, 7, 24, 26, 31, 52, 63, 112, 118; C. I. Acid Blue 9, 22, 40, 59, 93, 102, 104, 117, 120, 167, 229, 234; C. I. Acid Red 1, 6, 32, 37, 51, 52, 80, 85, 87, 92, 94, 115, 180, 256, 289, 315, 317; C. I. Acid Yellow 11, 17, 23, 25, 29, 42, 61, 71; C. I. Acid Orange 7, 19; C. I. Acid Violet 49; C. I. Basic Black 2; C. I. Basic Blue 1, 3, 5, 7, 9, 24, 25, 26, 28, 29; C. I. Basic Red 1, 2, 9, 12, 13, 14, 37; C. I. Basic Violet 7, 14, 27; and C. I. Food Black 1, 2.

The blending amount of the dye in the water base ink for ink-jet recording of the present invention is not specifically limited. In general, the blending amount of the dye is 0.1 to 20% by weight with respect to the total amount of the water base ink for ink-jet recording of the present invention. However, even when the blending amount is not less than 20% by weight, then the ink exhibits the stability, and no precipitate appears.

The pigment is not specifically limited, which may be any one of the inorganic pigment and the organic pigment. Among the pigments as described above, those preferred for the black-and-white recording include, for example, carbon blacks such as furnace black, lamp black, acetylene black, and channel black; metal oxides such as titanium oxide, and organic pigments such as orthonitroaniline black.

Among the pigments as described above, those preferably usable for the color recording include, for example, Toluidine Red, Permanent Carmine FB, Fast Yellow AAA, Disazo Orange PMP, Lake Red C, Brilliant Carmine 6B, Phthalocyanine Blue, Quinacridone Red, Dioxane Violet, Victoria Pure Blue, Alkaline Blue Toner, Fast Yellow 10G, Disazo Yellow AAOT, Disazo Yellow AAMX, Disazo Yellow HR, Disazo Yellow AAOA, Yellow Iron Oxide, Orthonitroaniline Orange, Dinitroaniline Orange, Vulcan Orange, Toluidine Red, Chlorinated Para Red, Brilliant Fast Scarlet, Naphthol Red 23, Pyrazolone Red, Barium Red 2B, Calcium Red 2B, Strontium Red 2B, Manganese Red 2B, Barium Lissome Red, Pigment Scarlet 3B Lake, Lake Bordeaux 10B, Anthosin 3B Lake, Anthosin 5B Lake, Rhodamine 6G Lake, Eosin Lake, red iron oxide, Naphthol Red FGR, Rhodamine B Lake, Methyl Violet Lake, Dioxazine Violet, Basic Blue 5B Lake, Basic Blue 6G Lake, Fast Sky Blue, Alkaline Blue R Toner, Peacock Blue Lake, indigo blue, navy blue, Reflex Blue 2G, Reflex Blue R, Brilliant Green Lake, Diamond Green Thioflavine Lake, Phthalocyanine Green G, Green Gold, Phthalocyanine Green Y, iron oxide, rust powder, zinc oxide, titanium oxide, calcium carbonate, clay, barium sulfate, alumina white, aluminum, bronze, daylight fluorescent pigment, pearl pigment, Naphthol Carmine FB, Naphthol Red M, Permanent Carmine FB, Fast Yellow G, Disazo Yellow AAA, Alkaline Blue G Toner, and surface-modified pigments obtained by treating the surface of the pigment with a specified functional group.

The blending amount of the pigment in the water base ink for ink-jet recording of the present invention differs depending on a desired printing density and coloration. However, the blending amount is generally 1 to 20% by weight and preferably 1 to 15% by weight with respect to the total amount of the water base ink for ink-jet recording of the present invention. Even when the blending amount is not more than 10% by weight, it is possible to obtain the sufficient coloring force and the high vividness.

A dispersing agent may be optionally added to the water base ink for ink-jet recording of the present invention, when the ink contains the pigment. The dispersing agent is not specifically limited. However, it is preferable to use, for example, high molecular weight polyurethane; polyester; and high molecular weight copolymer containing a functional group having strong affinity to the pigment including, for example, carbonyl group and amino group.

It is preferable that the water base ink for ink-jet recording of the present invention contains, as the solvent, a mixed solvent composed of water and the water-soluble organic solvent.

It is preferable that deionized water is used as the water rather than ordinary water containing various ions. The blending amount of the water in the water base ink for ink-jet recording of the present invention is determined within a wide range depending on the type and the composition of the water-soluble organic solvent and desired characteristics of the ink. However, the blending amount is generally 10 to 95% by weight, preferably 10 to 70% by weight, and more preferably 20 to 70% by weight with respect to the total amount of the water base ink for ink-jet recording of the present invention.

The water-soluble organic solvent is principally classified into those which have the effect to prevent the ink from drying at the tip of the ink-jet head and those which accelerate the drying speed on the paper surface. The water-soluble organic solvent, which has the effect to prevent the ink from drying, is not specifically limited, including, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or ketone alcohols such as acetone and diacetone alcohol; ethers such as tetrahydrofuran and dioxane; polyalkylene glycols such as polyethylene glycol and polypropylene glycol; alkylene glycols such as ethylene glycol, propylene glycol, butylene glycol, diethylene glycol, triethylene glycol, dipropylene glycol, tripropylene glycol, thiodiglycol, and hexylene glycol; glycerol; 2-pyrrolidone; N-methyl-2-pyrrolidone; and 1,3-dimethyl-2-imidazolidinone. In particular, it is preferable to use polyvalent alcohols such as alkylene glycols and glycerol.

The blending amount of the water-soluble organic solvent having the effect to prevent the ink from drying in the water base ink for ink-jet recording of the present invention is generally 0 to 95% by weight, preferably 10 to 80% by weight, and more preferably 10 to 50% by weight with respect to the total amount of the water base ink for ink-jet recording of the present invention.

The water-soluble organic solvent, which quicken the drying speed on the paper surface, is not specifically limited, including, for example, glycol-based ethers such as ethylene glycol monomethyl ether, ethylene glycol monoethyl ether, ethylene glycol monopropyl ether, diethylene glycol monomethyl ether, diethylene glycol monoethyl ether, diethylene glycol monopropyl ether, triethylene glycol monomethyl ether, triethylene glycol monoethyl ether, triethylene glycol monopropyl ether, propylene glycol monomethyl ether, propylene glycol monoethyl ether, propylene glycol monopropyl ether, dipropylene glycol monomethyl ether, dipropylene glycol monoethyl ether, dipropylene glycol monopropyl ether, tripropylene glycol monomethyl ether, tripropylene glycol monoethyl ether, and tripropylene glycol monopropyl ether.

The blending amount of the water-soluble organic solvent for quickening the drying speed on the paper surface in the water base ink for ink-jet recording of the present invention is generally 0 to 20% by weight, preferably 0.1 to 15% by weight, and more preferably 1 to 10% by weight with respect to the total amount of the water base ink for ink-jet recording of the present invention. If the blending amount is excessively large, then the permeability of the ink into the paper is too high, and any blur is caused in some cases.

Further, if necessary, the water base ink for ink-jet recording of the present invention may contain conventionally known additives such as viscosity-adjusting agents, surface tension-adjusting agents, and fungicidal agents. The viscosity-adjusting agent is not specifically limited, including, for example, polyvinyl alcohol, cellulose, and water-soluble resin.

The water base ink for ink-jet recording of the present invention is used in combination with the ink-jet recording apparatus in which the metal, especially the nickel or nickel alloy is used in the ink-jet head. When the anodic polarization measurement is performed on condition that the reference electrode is silver/silver chloride, the counter electrode is platinum, and the working electrode is the nickel or nickel alloy, the current density, which is obtained within an electric potential range of −600 to +300 mV, is not more than 100 $\mu A/cm^2$. Accordingly, the metal is not corroded by the ink. Thus, it is possible to avoid the discharge failure and the clog-up of the ink-jet recording apparatus.

The ink-jet recording apparatus in which the metal is used in the ink-jet head and the method for producing the ink of the present invention also belong to the present invention. When the ink of the present invention is prepared, it is preferable that the ink blending materials are selected and blended while adjusting their blending amounts so that the current density is not more than 100 $\mu A/cm^2$ under the condition of the anodic polarization measurement as described above. In particular, the selection of the coloring agent is important, because the reactivity of the coloring agent with respect to the nickel or nickel alloy differs.

EXAMPLES

The present invention will be explained in further detail below as exemplified by Examples. However, the present invention is not limited to only Examples.

Preparation of Inks

An ink solvent was prepared by mixing and agitating, for 10 minutes, 41.3 parts by weight of pure water, 25 parts by weight of glycerol, 0.5 part by weight of dipropylene glycol monopropyl ether, and 0.2 part by weight of a nonionic surfactant (trade name: Naloacty 100, produced by Sanyo Chemical Industries, Ltd.). 33 parts by weight of a black pigment dispersion (trade name: CABO-JET 300, produced by Cabot) was introduced into the ink solvent to perform agitation for 30 minutes, followed by being filtrated with a membrane filter having a pore size of 1 $\mu m$ to obtain a black ink K1.

An ink solvent was prepared by mixing and agitating, for 10 minutes, 41.2 parts by weight of pure water, 25 parts by weight of glycerol, 0.5 part by weight of dipropylene glycol monopropyl ether, 0.2 part by weight of a nonionic surfactant (trade name: Naloacty 100, produced by Sanyo Chemical Industries, Ltd.), and 0.1 part by weight of benzotriazole. 33 parts by weight of a black pigment dispersion (trade name: CABO-JET 300, produced by Cabot) was introduced into the ink solvent to perform agitation for 30 minutes, followed by being filtrated with a membrane filter having a pore size of 1 $\mu m$ to obtain a black ink K2.

71 parts by weight of pure water, 4 parts by weight of Direct Yellow 132, 18 parts by weight of triethylene glycol, and 7 parts by weight of triethylene glycol monobutyl ether were added to perform agitation for 30 minutes, followed by being filtrated with a membrane filter having a pore size of 0.7 $\mu m$ to obtain a yellow ink Y.

64.2 parts by weight of pure water, 0.8 part by weight of Basic Red 1, 15 parts by weight of 2-pyrrolidone, 15 parts by weight of polyethylene glycol #200, and 5 parts by weight of tetraethylene glycol monobutyl ether were added to perform agitation for 30 minutes, followed by being filtrated with a membrane filter having a pore size of 0.7 $\mu m$ to obtain a magenta ink M.

69 parts by weight of pure water, 5 parts by weight of C. I. Direct Blue 199, 11 parts by weight of glycerol, and 15 parts by weight of dipropylene glycol were added to perform agitation for 30 minutes, followed by being filtrated with a membrane filter having a pore size of 0.7 $\mu m$ to obtain a cyan ink C.

The obtained inks were evaluated by means of the following methods respectively.

Evaluation 1

An electrochemical measuring system (HZ-3000 produced by Hokuto Denko Co., Ltd.) and the electrodes shown in Table 1 were used to perform the anodic polarization measurement in accordance with the following method by using the system shown in FIG. 1. The iron-nickel alloy shown in Table 1 is so-called 42 Alloy containing 42% nickel. The nickel-phosphorus alloy is obtained by plating-treating the surface of 42 Alloy with a nickel plating treatment solution containing phosphorus.

TABLE 1

(Type of Respective Electrodes)

| Electrode | Type | Name | Manufacturer | Length (mm) × width (mm) × thickness (mm) |
|---|---|---|---|---|
| Reference electrode | silver/silver chloride | comparative electrode HS-205C | Toa Electronics Ltd. | — |
| Counter electrode | platinum | pure platinum plate | Tanaka Kikinzoku | 40 × 20 × 0.1 |
| Working electrode | iron-nickel alloy | 42 Alloy | Yamaha Metanix Corporation | 40 × 10 × 0.1 |
| | nickel | industrial pure nickel (Ni) | — | 40 × 10 × 0.1 |
| | nickel-phosphorus alloy | Nimuden NPR4 (Ni—P) | C. Uemura & CO., LTD. | plating layer of 6 $\mu m$ on surface of 42 Alloy |
| | copper | industrial pure copper (Cu) | — | 40 ×10 × 0.3 |

A specified measuring method of the anodic polarization measurement is shown below. (1) The water base ink 10 for ink-jet recording was introduced into the beaker 11, and the beaker 11 was immersed for 30 to 60 minutes in the thermostatic tank 9 set to 60° C. so that the temperature of the water base ink 10 for ink-jet recording was 60° C. (2) A metal piece, which was used for the working electrode 3, was immersed for 5 minutes in an alkaline washing solution (ACE CLEAN 850 produced by Okuno Chemical Industries Co., Ltd.) at 60° C., and then the metal piece was washed with pure water. (3) The metal piece to be used as the working electrode 3 and a platinum plate to be used as the counter electrode 4, which were electrically connected to the main apparatus body 1, were immersed in the water base ink 10 for ink-jet recording introduced into the beaker 11. (4) A silver/silver chloride plate to be used as the reference electrode 2, which was electrically connected to the main apparatus body 1, was immersed in the saturated potassium chloride solution 7 introduced into the reference electrode tank 6 connected to the water base ink 10 for ink-jet recording introduced into the beaker 11 by the aid of the potassium chloride salt bridge 5. (5) The electric potential was continuously changed within the electric potential range of −600 to +300 mV to measure the current density.

Results of the anodic polarization measurement are shown as graphs in FIGS. 2 to 5. The maximum current densities of the respective inks, which were obtained in the electric potential range for the measurement, are shown in Table 2.

TABLE 2

(Maximum Current Densities of Respective Inks ($\mu A/cm^2$))

| Ink | 42 Alloy | Ni | Ni—P | Cu |
|---|---|---|---|---|
| K1 | larger than 100 | 2.7 | larger than 100 | 80.7 |
| K2 | 90.2 | 2.7 | 86.6 | 52.6 |
| Y | larger than 100 | larger than 100 | larger than 100 | 98.5 |
| M | larger than 100 | 9.7 | larger than 100 | larger than 100 |
| C | 9.5 | 3.8 | larger than 100 | larger than 100 |

Evaluation 2

The same metal piece as the metal piece to be used for the working electrode was immersed in the ink, followed by being left to stand at 60° C. for 2 weeks in a closed state. After being left to stand, the metal piece was taken out and washed with pure water to confirm the surface state. When the surface was not corroded, + was given. When the surface was corroded, − was given. Further, the ink subjected to the immersion was analyzed by using a plasma emission analyzer (ICP-1000IV produced by Shimadzu Corporation) to investigate eluted elements. When nothing was detected, − was given. Results of the confirmation are shown in Table 3 for the surface state of the metal piece immersed in the ink and in Table 4 for the eluted elements detected by the plasma emission analyzer. According to the results shown in Table 4, it is understood that the detected metals are constitutive elements of the metal pieces. According to the results shown in FIGS. 2 to 5 and Tables 3 and 4, it is understood that in the case of several combinations of the ink and the working electrode, the current density is suddenly raised when the metal species begins to elute from the metal piece as a result of the contact with the ink. The value of the maximum current density exceeded the measurement limit within the electric potential range of −600 to +300 mV, and the measurement was unsuccessful in the case of almost all of the inks in which the maximum current density exceeded 100 $\mu A/cm^2$ within the electric potential range of −600 to +300 mV.

TABLE 3

(Surface State after Being Left to Stand for 2 Weeks at 60° C.)

| Ink | 42 Alloy | Ni | Ni—P | Cu |
|---|---|---|---|---|
| K1 | − | + | − | + |
| K2 | + | + | + | + |
| Y | − | − | − | + |
| M | − | + | − | − |
| C | + | + | − | − |

TABLE 4

(Eluted Elements after Being Left to Stand for 2 Weeks at 60° C.)

| Ink | 42 Alloy | Ni | Ni—P | Cu |
|---|---|---|---|---|
| K1 | Fe, Ni | — | Fe, Ni, P | — |
| K2 | — | — | — | — |
| Y | Fe, Ni | Ni | Fe, Ni, P | — |
| M | Fe, Ni | — | Fe, Ni, P | Cu |
| C | — | — | Fe, Ni, P | Cu |

Evaluation 3

An ink-jet head was used, which had a structure equivalent to that of an ink-jet head disclosed in Japanese Patent Application Laid-open No. 2002-36545. The metal piece, which was used for the working electrode in Evaluation 1, was used for a nozzle plate of the ink-jet head to confirm the continuous discharge performance and confirm the intermittent discharge performance. When the continuous discharge performance was confirmed, the discharge was performed continuously for 24 hours at respective atmospheric temperatures of 5° C., 20° C., and 40° C. respectively. The intermittent discharge performance was confirmed as follows. That is, the discharge for 1 minute was repeatedly performed 100 times, and the discharge was performed arbitrarily, followed by being left to stand for 2 months to confirm whether or not the discharge was successfully performed again. When the discharge was stable without causing any clog-up at the tip of the ink-jet head and the printing was successfully performed in a well-suited manner in both of the discharge confirmation tests, then + was given. When the discharge was unstable and any satisfactory printing was unsuccessful, then − was given. Results are shown in Tables 5 and 6.

TABLE 5

(Continuous Discharge Performance of Respective Inks)

| Ink | 42 Alloy | Ni | Ni—P | Cu |
|---|---|---|---|---|
| K1 | − | + | − | + |
| K2 | + | + | + | + |
| Y | − | − | − | + |
| M | − | + | − | − |
| C | + | + | − | − |

TABLE 6

(Intermittent Discharge Performance of Respective Inks)

| Ink | 42 Alloy | Ni | Ni—P | Cu |
|-----|----------|-----|------|-----|
| K1  | −        | +   | −    | +   |
| K2  | +        | +   | +    | +   |
| Y   | −        | −   | −    | +   |
| M   | −        | +   | −    | −   |
| C   | +        | +   | −    | −   |

In any one of the combinations of the ink and the metal material in which the metal was not corroded by the ink and no problem was caused in the discharge performance of the ink even in the case of the use in the ink-jet head, the current density, which was obtained within the electric potential range of −600 to +300 mV, was not more than 100 $\mu$A/cm$^2$, when the anodic polarization measurement was performed for the ink on condition that the reference electrode was silver/silver chloride and the working electrode was the metal. On the other hand, in any one of the combinations of the ink and the metal material in which the discharge performance of the ink was deteriorated in the case of the use in the ink-jet head, the current density, which was obtained within the electric potential range of −600 to +300 mV, was not less than 100 $\mu$A/cm$^2$, when the anodic polarization measurement was performed for the ink on condition that the reference electrode was silver/silver chloride and the working electrode was the metal. Benzotriazole is added to the black ink K2 as compared with the black ink K1. According to the results described above, it is appreciated that the corrosion resistance for the nickel alloy is improved by benzotriazole.

Even when the current density exceeds 100 $\mu$A/cm$^2$ with respect to the specified metal piece in the ink, the ink can be blended again so that the current density is not more than 100 $\mu$A/cm$^2$ by adding the additive such as benzotriazole, changing the coloring agent, or appropriately changing the blending amount. When the ink, in which the maximum current density is not more than 100 $\mu$A/cm$^2$ under the condition as described above, is prepared as described above, it is possible to obtain the satisfactory discharge performance even for the ink-jet recording apparatus in which the metal of the specified metal piece is used for the constitutive material for the ink flow passage.

The ink of the present invention does not corrode the metal in the ink-jet head, especially the nickel or nickel alloy. It is possible to provide the ink-jet recording apparatus which makes it possible to obtain the stable discharge performance.

An embodiment of an ink jet printer as an ink-jet recording apparatus in accordance with the invention will be described as below with reference to the accompanying drawings.

Figure 6:
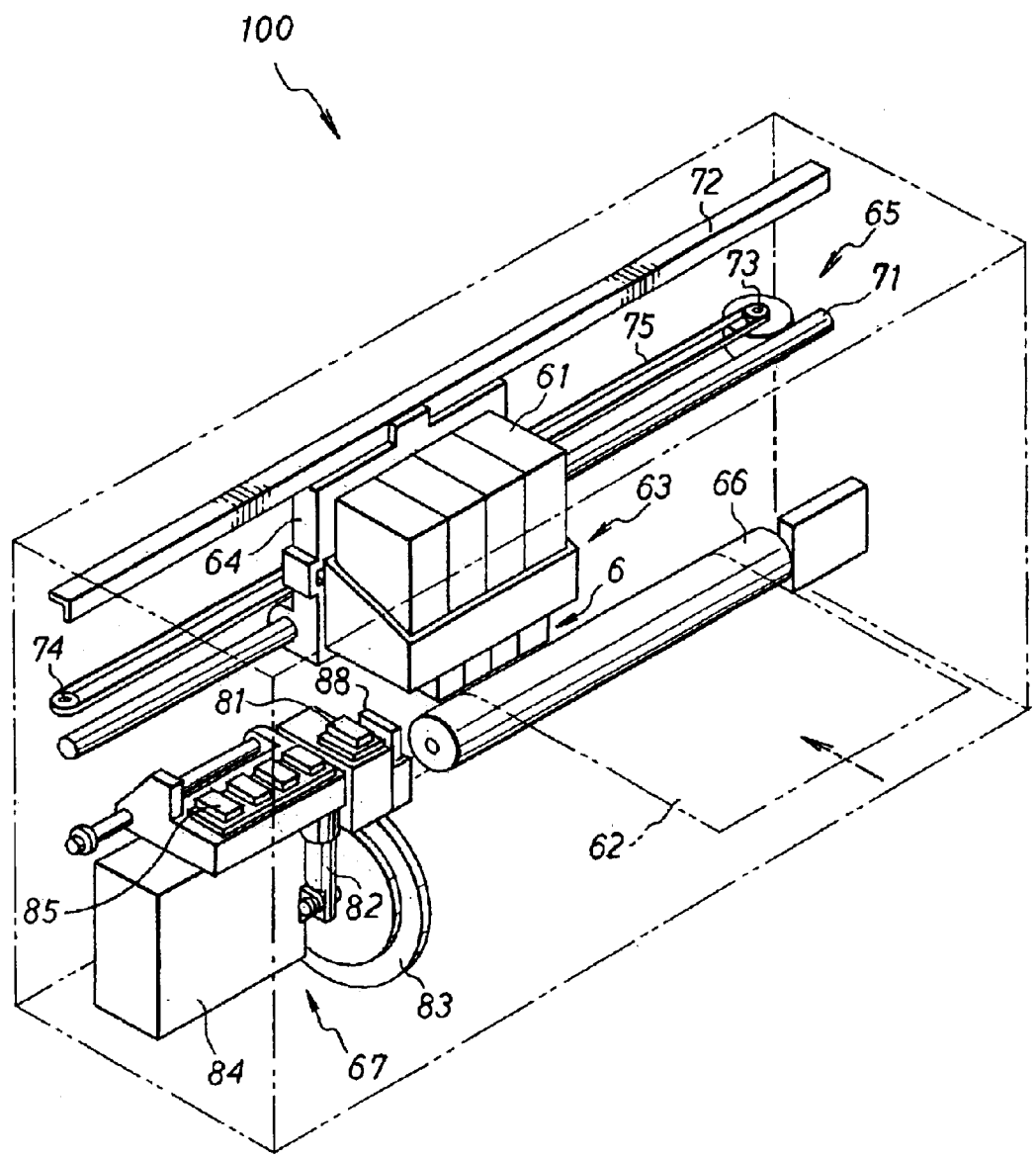
FIG. 6 is a perspective view showing a color ink-jet printer having an ink cartridge which contains ink prepared in examples of the invention.

As shown in FIG. 6, a color ink jet printer 100 includes four ink cartridges (ink tank) 61, each of which contains a respective color of ink, such as cyan, magenta, yellow and black ink, a head unit 63 having an ink jet printer head 6 (hereinafter referred to as a head 6) for ejecting ink onto a sheet 62, a carriage 64 on which the ink cartridges 61 and the head unit 63 are mounted, a drive unit 65 that reciprocates the carriage 64 in a straight line, a platen roller 66 that extends in a reciprocating direction of the carriage 64 and is disposed opposite to the head 6, and a purge unit 67. As the black, cyan, magenta and yellow ink, the ink prepared in the above examples can be used.

The drive unit 65 includes a carriage shaft 71, a guide plate 72, two pulleys 73 and 74, and an endless belt 75. The carriage shaft 71 is disposed at a lower end portion of the carriage 64 and extends in parallel with the platen roller 66. The guide plate 72 is disposed at an upper end portion of the carriage 64 and extends in parallel with the carriage shaft 71. The pulleys 73 and 74 are disposed at both end portions of the carriage shaft 71 and between the carriage shaft 71 and the guide plate 72. The endless belt 75 is stretched between the pulleys 73 and 74.

As the pulley 73 is rotated in normal and reverse directions by a motor, the carriage 64, connected to the endless belt 75, is reciprocated in the straight direction, along the carriage shaft 71 and the guide plate 72, in accordance with the normal and reverse rotation of the pulley 73.

The sheet 62 is supplied from a sheet cassette (not shown) provided in the ink jet printer 100 and fed between the head 6 and the platen roller 66 to perform predetermined printing by ink droplets ejected from the head 6. Then, the sheet 62 is discharged to the outside. A sheet feeding mechanism and a sheet discharging mechanism are omitted from FIG. 6.

The purge unit 67 is provided on a side of the platen roller 66. The purge unit 67 is disposed to be opposed to the head 6 when the head unit 63 is located in a reset position. The purge unit 67 includes a purge cap 81, a pump 82, a cam 83, and a waste ink reservoir 84. The purge cap 81 contacts a nozzle surface to cover a plurality of nozzles (described later) formed in the head 6. When the head unit 63 is placed in the reset position, the nozzles in the head 6 are covered with the purge cap 81 to inhale ink including air bubbles trapped in the head 6 by the pump 82 and by the cam 83, thereby purging the head 6. The inhaled ink is stored in the waste ink reservoir 84.

To prevent ink from drying, a cap 85 is provided to cover the nozzles 15 (FIG. 7) in the head 6 mounted on the carriage 64 when it returns to the reset position after printing. The ink jet printer 100 is further provided with a wiper 88 adjacent to the purge cap 81. The wiper 88 wipes the nozzle surface to remove the ink on the surface.

Figure 7:
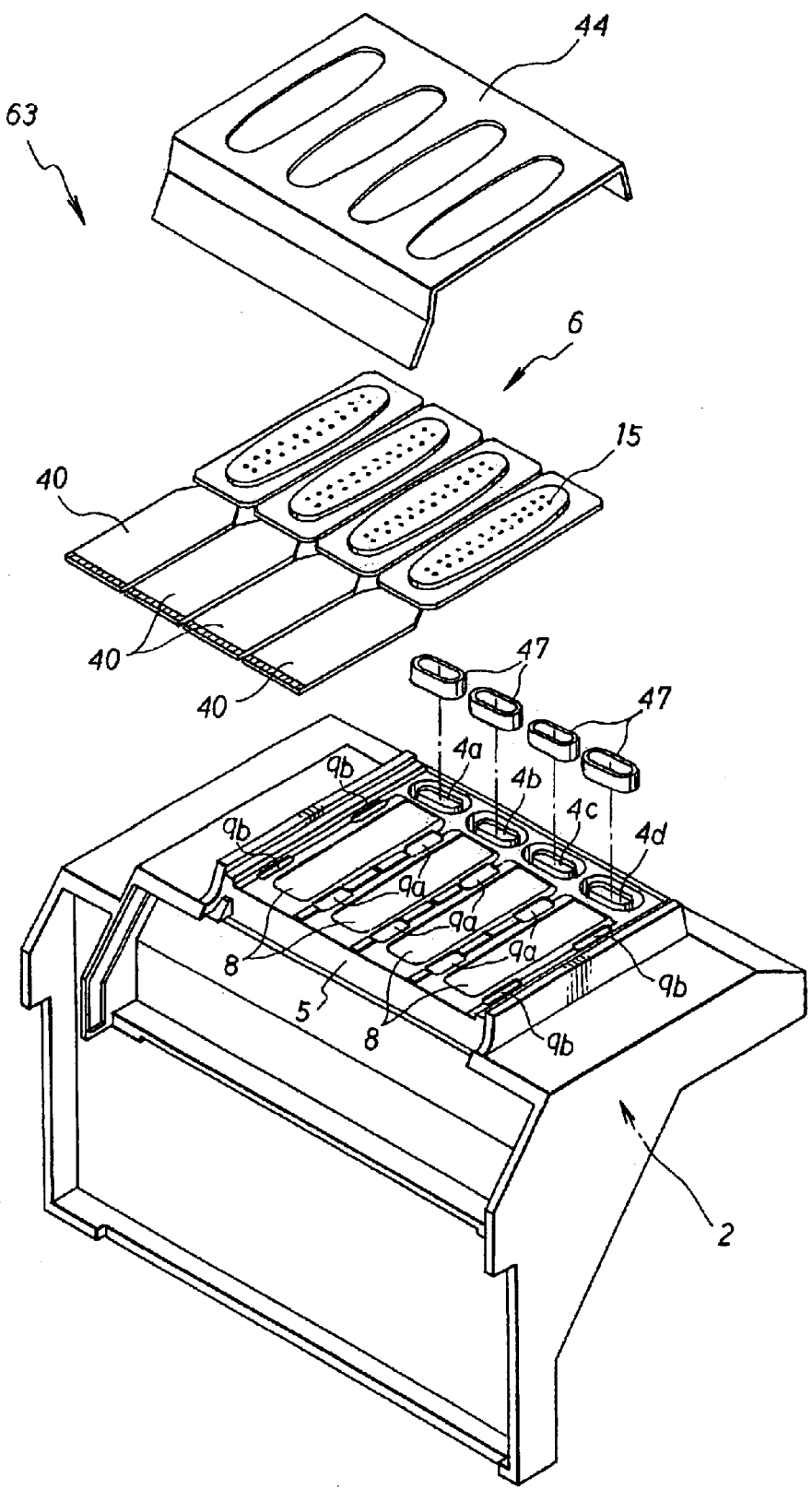
FIG. 7 is a perspective view of a head unit, with its nozzles facing upward.

As shown in FIG. 7, the head unit 63 is mounted on the carriage 64 that moves along the sheet 62 and has a substantially box shape with upper open structure. The head unit 63 has a cover plate 44 made of an elastic thin metallic plate. The cover plate 44 is fixed at the front surface of the head unit 63 and covers the head unit 63 when the head 6 is removed. The head unit 63 also has a mounting portion 2 on which the four ink cartridges 61 are detachably attached from above. Ink supply paths 4a, 4b, 4c, 4d, each of which connects respective ink discharge portions of each ink cartridge 61, communicate with a bottom of a bottom plate 5 of the head unit 63. Each of the ink supply paths 4a, 4b, 4c, 4d is provided with a rubber packing 47 to intimately contact an ink supply hole 19a.

The head 6 is constructed from four blocks that are arranged in parallel to each other. On the underside of the bottom plate 5, four stepped supports 8 are formed to receive the respective blocks of the head 6. In the bottom plate 5, a plurality of recesses 9a, 9b, which are filled with an UV adhesive to bond the respective blocks of the head 6, are formed to penetrate the bottom plate 5.

Figure 8:
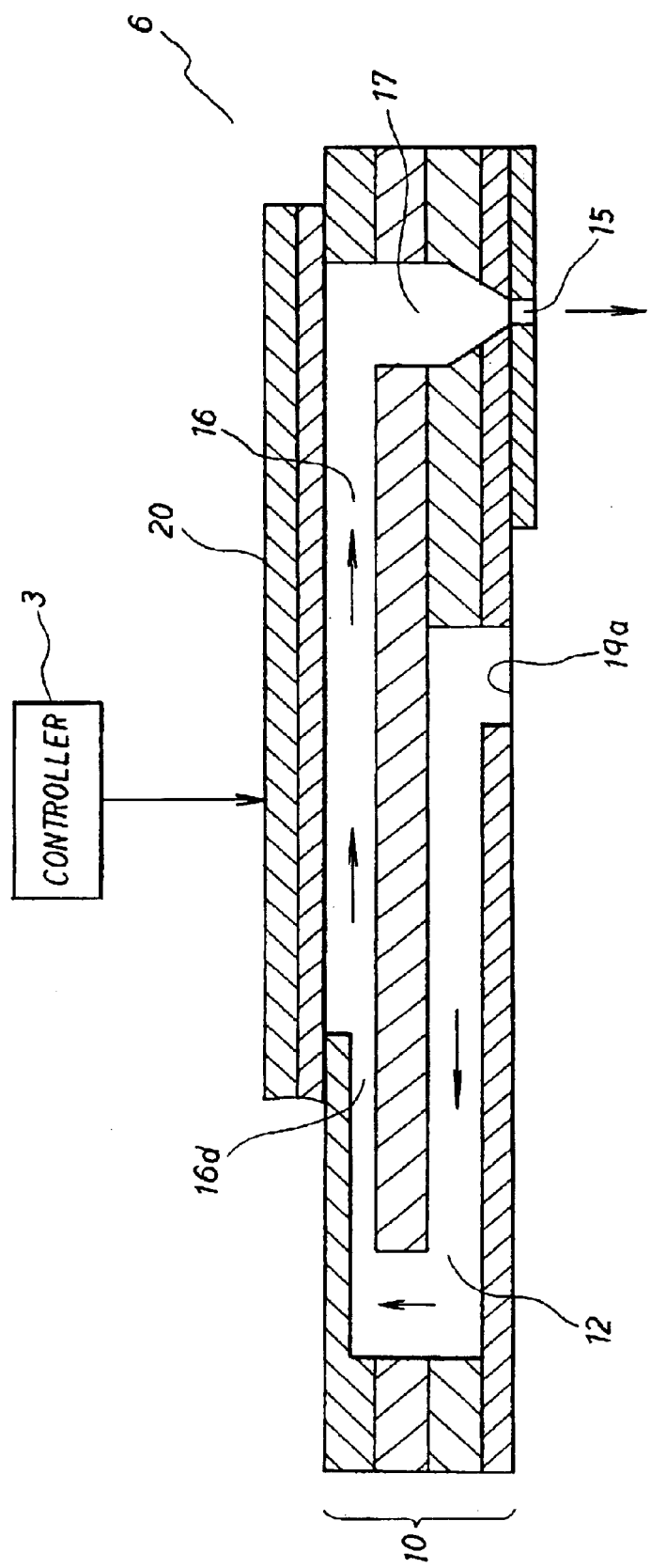
FIG. 8 is a schematic diagram showing the ink jet print head and a controller.

FIG. 8 is a sectional view showing one of the pressure chambers in the head 6. A plurality of pressure chambers 16 are provided in the head 6. The nozzles 15 communicating the respective pressure chambers 16 are provided substantially in line in one surface of the head 6.

As shown in FIG. 8, the head 6 is constructed by the cavity plate 10 comprised of a plurality of thin metal plates which are formed of nickel or nickel alloy and the piezoelectric actuator 20. The cavity plate 10 has the ink supply holes 19a connected with the ink cartridge 61, the manifolds 12, the narrowed portions 16d, the pressure chambers 16, the through holes 17 and the nozzles 15, which communicate with each other. While the ink supply hole 19a opens toward the ejecting direction of the nozzle 15 in FIG. 8 for convenience, the ink supply hole 19a actually opens toward the piezoelectric actuator 20.

A controller 3 provides a prestored driving pulse to the piezoelectric actuator 20 by superimposing the driving pulse on a clock signal. The driving pulse can be controlled with a technique disclosed in, for example, U.S. Pat. Nos. 6,312,089, 6,412,923 B1 and 6,760,959. Further, the detailed structure of the printer and controlling method of the head unit are also disclosed in these U.S. patents, a content of which has been incorporated herein by reference.

What is claimed is:

1. A water base ink for ink-jet recording which is used for an ink-jet recording apparatus having an ink-jet head provided therein with an ink flow passage formed of nickel or nickel alloy, the water base ink for ink-jet recording comprising:

a coloring agent;

water; and a water-soluble organic solvent, wherein:

a current density, which is obtained within an electric potential range of −600 to +300 mV, is not more than 100 $\mu$A/cm$^2$ when anodic polarization measurement is performed by using a reference electrode of silver/silver chloride, a counter electrode of platinum, and a working electrode of nickel or nickel alloy.

2. The water base ink for ink-jet recording according to claim 1, further comprising benzotriazole.

3. An ink-jet recording apparatus comprising:

an ink-jet head which jets an ink and which is provided therein with an ink flow passage formed of nickel or nickel alloy; and an ink tank which accommodates the ink, wherein:

the ink comprises a coloring agent, water, and a water-soluble organic solvent; and a current density, which is obtained within an electric potential range of −600 to +300 mV, is not more than 100 $\mu$A/cm$^2$ when the ink is subjected to anodic polarization measurement by using a reference electrode of silver/silver chloride, a counter electrode of platinum, and a working electrode of nickel or nickel alloy.

4. The ink-jet recording apparatus according to claim 3, wherein the ink further comprises benzotriazole.

5. A method for producing a water base ink for ink-jet recording which is used for an ink-jet recording apparatus having an ink-jet head provided therein with an ink flow passage formed of nickel or nickel alloy, the method comprising:

blending a coloring agent, water, and a water-soluble organic solvent so that a current density, which is obtained within an electric potential range of −600 to +300 mV, is not more than 100 $\mu$A/cm$^2$ when anodic polarization measurement is performed for the ink by using a reference electrode of silver/silver chloride, a counter electrode of platinum, and a working electrode of nickel or nickel alloy.

6. The method for producing the water base ink for ink-jet recording according to claim 5, further comprising adding benzotriazole to the ink.

\* \* \* \* \*